United States Patent [19]
Knifton et al.

[11] 3,821,309
[45] June 28, 1974

[54] PROCESS FOR PREPARING KETONES

[75] Inventors: John F. Knifton, Wappingers Falls;
Irving Schwager, Hopewell Junction, both of N.Y.

[73] Assignee: Texaco Inc., New York, N.Y.

[22] Filed: Dec. 2, 1969

[21] Appl. No.: 881,634

[52] U.S. Cl...... 260/586 R, 260/586 A, 260/593 R
[51] Int. Cl............................................... C07c 45/00
[58] Field of Search......... 260/586 R, 593 R, 586 A

[56] References Cited
UNITED STATES PATENTS
2,822,398  2/1958  McClure ........................ 260/586 R

*Primary Examiner*—Leon Zitver
*Assistant Examiner*—Norman Morgenstern
*Attorney, Agent, or Firm*—Thomas H. Whaley; Carl G. Ries

[57] ABSTRACT

This invention concerns the transformation of nitrated substrates, particularly nitroparaffins, to the corresponding ketone using a homogenous metal catalyst such as ferrous salt, in the presence of an aqueous-inert solvent mixture, at moderately elevated temperatures.

11 Claims, No Drawings

PROCESS FOR PREPARING KETONES

This invention concerns the preparation of ketones from nitrated substrates.

More particularly this invention relates to the preparation of ketones from nitrated substrates utilizing homogenous catalysts and mild reaction conditions.

Ketones, particularly the lower alkyl ketones, are useful as solvents (g.v.) for vinyl resins and as intermediates for the preparation of detergents, fuel additives and the like.

Ketones, especially aliphatic ketones, are prepared most commonly by the pyrogenic decomposition of alkaline earth metal salts of fatty acids at 400°–500° C., using an alkaline earth or thorium oxide catalyst. Other processes include the oxidation or dehydrogenation of secondary alcohols, the hydration of acetylenes, the cleavage of certain esters among others. While the aforementioned processes are useful and generally satisfactory none of them utilize nitrated substrates as the starting material. Nitrated substrates are desirable starting materials since they are currently available in large supply from petrochemical sources.

Recently, the applicants have discovered a process for catalytically transforming nitrated substrates to the corresponding ketones in good yield under mild reaction conditions of time, temperature and pressure.

Therefore, it is an object of this invention, among others, to produce ketones from nitrated substrates under mild reaction conditions.

More specifically it is an object of this invention to produce alkyl ketones (paraffinones) from nitroparaffins using a homogenous catalyst system.

Other objects will suggest themselves to those skilled in the art after a perusal of this disclosure.

In practice, the novel process of this invention for preparing a ketone product comprises the steps of:

a. admixing a nitrated substrate having 1 to 40 carbon atoms, with at least 0.2 molar quantities of both a strongly alkaline material and a homogenous metal catalyst, in the presence of sufficient aqueous-inert solvent mixture to solubilize said nitrated substrate and to form a reaction mixture, and b. heating said reaction mixture between about 0° and 150° C. until a ketone product is prepared.

The ketone product can be isolated by standard techniques such as decantation, centrifugation or the like. Purification can be effected by vacuum distillation, chromatographic separation or by any other procedure utilized in the art for purification of ketones.

In the favored practice, the novel process of this invention for preparing aliphatic ketone product comprises the steps of:

a. admixing nitroaliphatic substrate having 6 to 24 carbon atoms with at least equi-molar quantities of both a strongly alkaline material and a homogenous metal catalyst, such as iron, cobalt, chromium, ruthenium salts or their mixtures, in the presence of sufficient aqueous-inert solvent to solubilize the nitroaliphatic substrate and to form a reaction mixture, and b. heating the reation mixture between about 10° to about 120° C. until said aliphatic ketone product is prepared. Again separation and purification may be effected by decantation and/or vacuum distillation.

In the preferred practice for preparing paraffin ketone product, the novel process comprises the steps of:

a. admixing a nitroparaffin substrate containing 10 to 15 carbon atoms with from one to six moles of strongly alkaline material such as alkali metal carbonates, alkali metal oxides, alkali metal hydroxides, alkali metal alkoxides and quaternary ammonium hydroxides, or their mixtures, in the presence of sufficient aqueous-inert solvent mixture, in which the inert component of said mixture is chosen from alkanols containing up to 4 carbon atoms, aprotic solvents, alkayl ethers of ethylene and propylene glycols and mixtures of these solvents, to form an admixture, then b. contacting said admixture with from 1 to 6 moles of catalyst salt such as iron and ruthenium salts, and the mixtures of these salts, c. heating said catalyst-containing mixture between about 25° and 90° C. until ketone is prepared and, d. separating the ketone produced and e. purifying it by vacuum distillation.

In order to further aid in the understanding of this invention the following supplemental disclosure is submitted:

A. Nitrated Aliphatic Substrates — The nitrated materials which can be utilized as substrates comprise non-aromatic nitroaliphatics of both the linear and cyclic type. These substrates can contain from 1 to 40 or more carbon atoms. Particularly favored are the secondary nitroparaffins containing from 6 to 24 carbon atoms. Mixtures of secondary nitroparaffins containing 10 to 15 carbon atoms are preferred because they are potentially available in large quantities from the vapor-liquid phase nitration of normal paraffins as described in the literature. These mixtures of secondary nitroparaffins with the nitro groups randomly distributed along the hydrocarbon chain can be in the presence of up to 75 percent or more by weight of paraffinic hydrocarbon.

B. Strongly Alkaline Materials — These materials include the alkali metal fluorides, carbonates, oxides, hydroxides and alkoxides, as well as other strongly alkaline materials such as quaternary alkyl ammonium hydroxides and the like. These strongly alkaline materials are utilized in concentrations sufficient to ionize the nitroparaffin being treated. Ordinarily this requires at least a molar equivalent of alkaline material based on the quantity of nitrated substrate employed. More usually a molar excess of alkaline material to nitroparaffin substrate is desirable. This excess ranges from a molar ratio of 2:1 to 5:1 of alkaline material to nitroparaffin substrate.

C. Solubilizing Inert Solvent — It is desirable for optimum yields to utilize sufficient inert solvent to solubilize the nitroparaffin substrate and facilitate contact of the strongly alkaline material, homogenous catalyst and nitrated substrate. Inert, as used herein, refers to solvents which do not take part in or disrupt the desired transformation from taking place. The amount of inert solvent usually used may comprise from about 10 to 98 percent by weight of the entire reaction mixture. Illustrative inert solvents include the lower alkanols such as methyl, ethyl, propyl and butyl alcohols, the alkyl ethers of ethylene and propylene oxide commonly referred to as "cellosolves," the aprotic solvents particularly those having a dielectric contant F in excess of 15° at 25° C., and which cannot donate protons for hydrogen bonding to an appreciable extent. Illustrative of the aprotic solvents which can be used include the alkyl sulfoxides such as dimethyl and diisopropyl sulfoxide, alkyl formamides such as N,N-dimethyl formamide, alkyl phosphoramides such as trimethyl and hexamethyl phosphoramides.

The preferred inert solvents are the lower alkanols of from 1 to 4 carbon atoms and their mixtures. These solvents are economical, relatively easy to handle, solubilize the alkaline material and provide a good dispersion of the multicomponent reaction mixture.

D. Aqueous Co-Solvent — Water is also a necessary constituent of the reaction mixture. The water component may constitute as little as up to 98 percent by weight of the total reaction mixture. Preferably, the water content will constitute from 25 to 75 percent by weight of said mixture. The favored procedure is to add the water to the nitroparaffin substrate, either prior to or concurrently with the homogenous metal catalyst. Preferably the metal catalyst is solubilized in water or in some aqueous-inert solvent mixture.

E. Homogenous Metal Catalysts — The catalysts of this invention are classified as homogenous inasmuch as they are initially present in the same phase (the liquid phase) as the other reactants. The homogenous metal catalyst can be in the form of salts, such as chloride, bromide, sulfate, acetate and the like, or in the form of their complexes, such as the 1,10-phenanthrolines or acetylacetone. Mixtures of salts and/or complexes may also be used. The cations of the homogenous metal catalysts employed in the inventive process are selected from Groups VI, VII and VIII of the Periodic Table. While there is a considerable disparity in catalytic activity between the cations of the above classes, most salts and/or complexes deomonstate some catalytic activity under the conditions of the inventive process. However, nickel and manganese salts show little catalytic activity. The favored catalysts are the salts and complexes of iron, ruthenium cobalt and chromium as well as their mixtures. Inasmuch as iron and ruthenium salts give much greater yields than the cobalt or chromium salts, they represent the preferred catalysts of this invention. Within this group of preferred catalysts, the chlorides and bromide salts, and their mixture, are the most preferred catalytic materials because they are readily available in a high state of purity, at relatively modest cost and they function well for catalytic purposes. Copper, which generally has catalytic activity in a number of reactions, exhibited no catalytic activity at all under the reaction conditions of this invention.

For optimum yields of ketone product, it is desirable to solubilize the homogenous metal catalyst salt or salts in solvent prior to its contact with the nitroparaffin substrate. Where solubilities permit it, water or mixtures of water and inert solvents can be employed for this purpose. Illustrative solvents include alkanols, ethers, aprotic solvents and their mixtures as described supra in Section C.

F. Non-Oxidizing Atmosphere — As can be established by the data presented in Table I the inventive transformation proceeds best in the substantial absence of oxygen. For this reason an atmospheric environment of air or other oxygen mixtures should be avoided. If air is used, larger amounts of catalyst must be employed since it is believed that the catalysts as illustrated by ferrous salts are partially oxidized and their efficiency to produce ketones is substantially diminished. Because of this, the use of a non-oxidizing atmosphere is favored. Illustrative non-oxidizing atmospheres can be provided by hydrogen, nitrogen, the inert gases, such as argon, neon, helium and their mixtures. Other gases, such as carbon dioxide and carbon monoxide can also be employed but are less favored. The preferred non-oxidizing gases are hydrogen and nitrogen and their mixtures. These gases are preferred because they provide good yields of ketone, are relatively inexpensive and are available in a high state of purity.

G. Reaction Conditions, Temperatures, Pressures and Time, etc.
1. Temperature — As stated earlier, the inventive process can be conducted at relatively mild temperatures, that is from about 0° to about 150° C. and higher. Inasmuch as lower temperatures unduly increase reaction time and the higher temperatures require the use of higher boiling inert solvents or pressurized reactors, temperatures between about 10° to 120° C. are more usually employed. The preferred temperature range is between about 25° to 90° C. since this range provides good yields of product within a reasonable period of time. Further, this temperature range permits the use of lower boiling solvents, such as alkanols, without the need for using a pressurized system.
2. Pressures — Atmospheric pressures or near atmospheric pressures are preferred as they provide good yields without the increased cost and risk of pressurized systems.
3. Chelating Agents and Complexing Agents — In some instances the use of complexing agents can be made to provide better contact of the catalyst, particularly iron salt catalysts but results are not usually improved. Illustrative complexing agents which can be used are phenanthroline and acetylacetone and the like.
4. Reaction Time — One of the advantages of the inventive process is that it is conducted under mild reaction conditions and produces good yields of the ketone product within short reaction times. Since reaction times are dependent upon the nitrated substrate employed, the relative proportions of the reaction mixture and the reaction temperatures and pressures, only ranges of reaction time can be stated with any precision. However, when the reaction is conducted using the preferred nitroaliphatics under atmospheric pressures and temperatures, reaction times usually range from about 1 minute to 8 hours with 1 to 2 hours representing a reliable average reaction time.
5. Isolation and Purification Procedures — This invention comprises transforming nitroparaffin substrates to the corresponding ketone. The isolation and purification of product, while necessary for many applications, is not critical to invention. For example, ordinarily, after the reaction mixture is heated and allowed to cool, it separates into two phases, a lower more lightly colored aqueous phase and a more highly colored upper phase containing ketone product. A simple method of isolation is by decantation or more elaborately by centrifugation. Purification is usually effected by vacuum distillation especially at vacuums of 10 mm of mercury or lower.

H. Ratio of Reactants to Each Other — It has been determined that at least 0.2:1 molar quantities of strongly alkaline material and homogenous metal catalysts to nitro-paraffin substrate are required for the reaction to provide even minimal yields. For more acceptable yields, both the strongly alkaline material and the homogenous metal catalyst must be present in at least equi-molar quantities. Where a nitroaliphatic, or a mixture of nitroaliphatics, containing 10 to 15 carbon atoms is used as the substrate, and potassium hydroxide and ferrous salts are used as the alkaline material and catalyst respectively, molar ratios of 1 to 6 moles of alkaline material and catalyst, per mole of nitroaliphatic, provide optimum yields and are therefore preferred.

In order to describe the novel process in the greatest possible detail, the following illustrative examples are provided. Unless otherwise indicated, all parts and percentages are by weight not volume.

EXAMPLE 1.

PREPARATION OF AN ALIPHATIC KETONE FROM A NITROPARAFFIN SUBSTRATE CONTAINING PARAFFIN DILUENT.

A. An appropriately sized reaction flask equipped with stirring, heating and refluxing means, is charged with 12 ml (0.12 moles) of a nitrated n-dodecane mixture (comprising 25.9 percent by weight of nitrododecane, 64.1 percent by weight dodecane, 10 percent oxygenates and other paraffins). A solution of alcoholic potassium hydroxide (2 g in 25 ml of methanol) is slowly added to the stirred, externally cooled solution. The resulting reddish-colored solution is stirred for one-half of an hour and flushed with nitrogen. A degassed solution of 3 grams of anhydrous ferrous chloride (0.024 moles) in 40 ml of water is slowly added to the stirred reaction mixture and the mixture is heated to reflux for another hour under a nitrogen atmosphere. At this stage, the product mixture consists of a deep-red, paraffin phase rich in product, a light yellow aqueous phase, plus some reddish brown precipitated solid. On cooling, the paraffinic phase containing ketone product is decanted off from the aqueous phase and the dodecanone component, whose identity is confirmed by infra-red, gas chromatographic and nuclear magnetic resonance techniques, is isolated by vacuum distillation. A yield of 65 percent dodecanone based upon the nitrododecane starting material is obtained.

B. In a closely related run, a solution of 3 grams of potassium hydroxide in 40 ml of methanol is added slowly to a stirred mixture of 25 ml (0.025 moles) of the nitrated n-dodecane mixture (whose content is described in Part A above), contained in an externally cooled flask. The resulting reddish-colored solution is stirred for an additional 30 minutes and flushed with nitrogen. A nitrogen-saturated solution of ferrous chloride (10 grams, 0.079 moles) in 50 ml of water is added slowly to the stirred methanolic solution and the 2 phase product mixture which forms, is stirred for an additional hour under a nitrogen atmosphere. The paraffinic phase containing the dodecanone product is separated from the aqueous phase by decantation, and the desired dodecanone product, as confirmed above, is isolated by vacuum distillation.

C. In a closely related run, using the same proportion of reactants and solvents, the procedure of Example 1A is followed exactly except that 25 ml of N,N-dimethyl formamide is substituted for the 25 ml of methanol which was used to dissolve KOH. After stirring and flushing with hydrogen, 3 g of ferrous chloride in 40 ml of water is added slowly to the stirred mixture, and the mixture refluxed for another hour under hydrogen, cooled and the paraffin phase containing product is decanted off and isolated by vacuum distillation. Again good yields and conversions of nitroparaffin are obtained.

D. In another comparable run, the same experimental technique, proportions of reactants, solvents and catalyst used in Example 1 (A) are employed, except that a solution of 1.5 grams of sodium hydroxide in 30 ml of N,N-dimethyl formamide is substituted for the 3 grams of potassium hydroxide in 25 ml of the "formamide" previously used. The stirred reaction mixture, containing 0.12 moles of nitrated n-dodecane, is refluxed under a nitrogen atmosphere to form two phases then cooled. After cooling, the paraffin phase is separated by decantation and the ketone product is isolated by vacuum distillation. Yields comparable to that obtained in Example 1 (A) are obtained. Infra-red analysis confirms that the expected ketone product is produced.

EXAMPLE 2

PREPARATION OF A CYCLOALIPHATIC KETONE FROM A NITRATED CYCLOALIPHATIC SUBSTRATE

Using the procedure and apparatus described in Example 1(A), a solution comprising a 2 gram portion of potassium hydroxide dissolved in 30 ml of methanol, is added slowly to a cooled, stirred 0.01 molar portion of nitrocyclohexane in 10 ml of n-heptane. After stirring for an hour and flushing with hydrogen, a degassed aqueous solution of 3 grams of ferrous chloride is added slowly to the stirred mixture. The mixture is refluxed for another hour under hydrogen, then cooled to room temperature. The lighter paraffinic phase containing the ketone product is decanted off and the cyclohexanone is isolated by vacuum distillation to give a product which infra-red and nuclear magnetic resonance techniques confirm to be the expected cyclohexanone product.

EXAMPLE 3.

PREPARATION OF $C_{10} \rightarrow C_{14}$ PARAFFINONES FROM A $C_{10} \rightarrow C_{14}$ NITROPARAFFIN MIXTURE Using the preparative procedure of Example 1(A), a solution of 2 grams of potassium hydroxide in 25 ml of Methanol is added slowly to a cooled stirred mixture of 0.01 molar $C_{10}$–$C_{14}$ nitroparaffins. After stirring for an hour, a degassed solution of 3.5 grams of ferrous chloride in 50 ml of water is added to stirred mixture. The mixture is refluxed for 1½ hours, and upon cooling forms two layers, a lighter paraffinic phase containing ketone product and a heavier aqueous layer. The paraffinic layer is decanted off and the ketone mixture is separated by vacuum distillation. The ketone mixture's identity is confirmed by infra-red and N.M.R. analysis.

EXAMPLES 4 TO 16

EFFECT OF MODIFIED REACTION CONDITIONS ON THE CONVERSION OF NITRODODECANE TO DODECANONE

In these examples, the apparatus, preparative procedure and isolation technique used in Example 1(A) are utilized under varying reaction conditions, such as molar ratio of the reaction mixture, pressure and temperatures. The nitrododecane substrate comprised 25.9 percent by weight of nitrododecane, 64.1 percent by weight of dodecane and 9 percent by weight of other oxygenates and paraffins. The results of these runs are given in Table I as follows:

izes the results, iron and ruthenium (Group VIII) show the most catalytic activity of all of the members selected from Group VI, VII and VIII of the Periodic

TABLE I

EFFECT OF VARYING REACTION CONDITIONS ON THE CONVERSION OF NITRODODECANE TO DODECANONE

| Example | Molar Ratios of: $C_{12}H_{25}NO_2$:$FeCl_2$:KOH | | | KOH Solvent | Catalyst Solvent | Temp. (°C.) | Gas Composition | Reaction Time (hr.) | Yield of Dodecanone (%) |
|---|---|---|---|---|---|---|---|---|---|
| 4 | 1 | 2 | 2.5 | n-Propanol | Water | 90 | $N_2$ | 1 | 65 |
| 5 | 1 | 3.2 | 2.5 | Ethanol | do. | 25 | $H_2$ | 1 | 55 |
| 6 | 1 | 6. | 2.5 | do. | do. | 25 | $H_2$ | 1 | 55 |
| 7 | 1 | 1.6 | 2.5 | do. | do. | 25 | $H_2$ | 1 | 40 |
| 8 | 1 | 0.4 | 2.5 | do. | do. | {80 / 85} | $H_2$ / CO | 18 / 6 | 2 / 2 |
| 9 | 1 | 0.2 | 2.5 | do. | do. | 25 | $H_2$ | 1 | Trace |
| 10 | 1 | 0.2 | 2.5 | do. | do. | 92 | $H_2$(500 psig) | 5 | 5 |
| 11 | 1 | 5 | 5 | do. | do. | 75 | $N_2$ | 1 | <10 |
| 12 | 1 | 2 | 5 | do. | do. | 25 | $H_2$ | 1 | <10 |
| 13 | 1 | 1 | 1 | do. | do. | 25 | $H_2$ | 1 | 20 |
| 14 | 1 | 2 | 0.4 | do. | do. | {25 / 90} | $H_2$ / $H_2$ | 5 / 4 | 8 / 8 |
| 15 | 1 | 0.2 | 0.2 | do. | do. | 75 | $N_2$ | 1 | Trace |
| 16 | 1 | 2 | 2.5 | do. | do. | 75 | $O_2$ | 1 | 40 |

It is clear from these results that both the strongly alkaline material and ferrous chloride catalyst must be present in at least 0.2 molar quantities per mole of nitroparaffin for even minimal yields of paraffinone under the conditions of the inventive process. Satisfactory yields of alkyl ketones are obtained by selecting nitroparaffin, ferrous chloride, potassium hydroxide molar ratios within the range 1:1:1 to 1:6:6 respectively. Within these molar ratios, 50 percent and greater yields of paraffinone may be realized within reaction temperatures of 25°–90° C.

EXAMPLES 17 TO 23.

EFFECT OF USING DIFFERENT HOMOGENOUS CATALYSTS ON THE CONVERSION OF A MIXTURE OF $C_{10} \rightarrow C_{14}$ NITROPARAFFIN TO A MIXTURE OF $C_{10} \rightarrow C_{14}$ PARAFFINONES In these examples, the apparatus, procedure and reactants described in Example 3 are followed exactly except that instead of 0.024 moles of ferrous chloride, 0.024 of the indicated homogenous catalyst is used in its place. As can be seen from Table II which summarizes the results, iron and ruthenium (Group VIII) show the most catalytic activity of all of the members selected from Group VI, VII and VIII of the Periodic Table under the conditions of this invention. Cobalt (Group VIII) and chromium (Group VI) exhibit about equal activity. While nickel (Group VIII) and manganese (Group VII) show only trace activities, copper shows no activity.

EXAMPLES 24 TO 29

EFFECT OF USING DIFFERENT COMPLEXING AGENTS AND SOLVENTS (OTHER THAN WATER) ON THE CONVERSION OF MIXTURES OF $C_{10}$–$C_{14}$ NITROPARAFFINS TO KETONES

In Examples 24 to 29, the apparatus, procedure and reactants described in Example 3 are followed, except where indicated.

Examples 24 to 27 show the effect on the yield obtained when four different, complexing agents are present in the reaction mixture. As can be seen by Table III, 1,10-phenanthroline and acetylacetone appear to have no beneficial effects under the reaction conditions shown.

Examples 28 and 29 show the effect of substituting an alkanol such as ethanol for water (Example 28), or

TABLE II

CONVERSION OF $C_{10} \rightarrow C_{14}$ NITROPARAFFINS TO KETONES

| Example | Catalyst | Catalyst:Substrate Molar Ratio | Temp (°C) | Reaction Time (hr) | Yield of Ketone (%) |
|---|---|---|---|---|---|
| 17 | Ferric Chloride | 2:1 | 25 | 1 | 30 |
| 18 | Ruthenium (III) Chloride | 2:1 | 75 | 1 | 75 |
| 19 | Cobalt (II) Chloride | 2:1 | 75 | 1 | 10 |
| 20 | Nickel Chloride | 2:1 | 75 | 1½ | Trace |
| 21 | Copper (I) Chloride | 2:1 | 75 | 1 | None |
| 22 | Chromium (III) Chloride | 2:1 | 75 | 1 | 10 |
| 23 | Manganese (II) Sulphate | 2:1 | 75 | 1 | Trace | an aprotic solvent (dimethylsulfoxide, Example 29) for water. As shown in Table III, water appears to be an essential constituent of the catalyst system and no ketone formation is detected when water is eliminated from the system.

TABLE III

CONVERSION OF $C_{10} \rightarrow C_{14}$ NITROPARAFFINS TO KETONES

| Example | Catalyst | Additional Complexing Agent | METAL:LIGAND MOLAR RATIO | CATALYST SOLVENT | TEMP (°C) | REACTION TIME (HR) | KEYTONE YIELD (%) |
|---|---|---|---|---|---|---|---|
| 24 | Ferrous Chloride | 1,10 Phenanthroline | 2.5:1 | Water | 25 | 1 | 40-60 |
| 25 | Ferrous Chloride | Acetylacetone | 1:3 | Water | 75 | 1 | 20 |
| 26 | Potassium Ferrocyanide | — | 1:6 | Water | 75 | 1 | None |
| 27 | Iron Naphthenate | — | 1:3 | Paraffin | 67 | 1 | None |
| 28 | Ferrous Chloride | — | — | DMSO[1] | 82 | 1 | None |
| 29 | Ferrous Chloride | — | — | Ethanol | 70 | 1 | None |

[1]DMSO = Dimethylsulphoxide

As the many examples have established, the novel inventive process is advantageous and gives unexpected results. For example, using readily available nitrated substrates such as the nitroaliphatics, and inexpensive homogenous metal catalyst, ketone products are produced in an easily isolatable form, free from contaminants. Further, reaction conditions are mild and both the yields of ketone product and conversions of nitroparaffin substrates are consistently high. In addition, the reaction cycle is rapid and atmospheric or near atmospheric pressures can be employed.

The fact that the inventive process would readily transform nitroparaffin substrates to their corresponding ketones is completely unexpected in view of the literature references such as J.A.C.S. 61, 3194 (1939) and J.A.C.S. 77, 6266 (1955) which disclose that acid solutions of iron salts, catalyse the reduction of nitroparaffins to primary amines in good yield. Further buttressing the unexpected aspect of the inventive concept is the reported reduction of nitrobenzene to aniline, azoxybenzene and hydrazobenzene using a catalyst system of ferrous salts in basic media. The latter references are reported in J. Phys. Chem, 16, 131 (1912).

As the specification and examples indicate, numerous substitutions and modifications of things such as reactants, ratio of reactants, solvents and catalysts can be made without departing from the inventive concept. The metes and bounds of this invention can best be gleaned by a reading of the claims which follow, read in conjunction with the specification.

What is claimed is:

1. A process for catalytically transforming nitroparaffin substrates to their corresponding paraffinones in a non-oxidizing environment, said substrates being selected from the group consisting of nitrocyclohexane and linear nitroparaffins containing 1 to 40 carbon atoms, by A. Forming an aqueous, multi-component homogeneous reaction mixture by:
   1. contacting each molar equivalent of substrate to be transformed to paraffinone with,
   2. solubilizing inert solvent selected from the group consisting of the lower alkanols, the alkyl ethers of ethylene and propylene oxides and alkyl formamides with the proviso that said solvents solubilize said nitroparaffin substrates when present in amounts ranging from about 10 to 98 percent by weight of the entire reaction mixture,
   3. water in amounts ranging up to 98 percent by weight of said reaction mixture,
   4. homogeneous catalyst selected from the group consisting of the chlorides, bromides, sulfates, acetates, 1,10-phenanthrolines of iron, ruthenium, cobalt and chromium, said catalysts being present in at least molar equivalents of said substrates, and
   5. at least 0.2 molar quantities of strongly alkaline material selected from the group consisting of the alkali metal fluorides, carbonates, oxides, hydroxides and alkoxides and quaternary alkyl ammonium hydroxides, and B. Heating said reaction mixture between about 25° and 90°C in said non-oxidizing environment, at pressures ranging from about atmospheric up to 500 psig, until said paraffinone product is formed.

2. The process of claim 1 wherein the reaction mixture comprises a mixture of nitroparaffins, and up to 75 percent by weight and higher of paraffins.

3. The process of claim 1 wherein said strongly alkaline material is selected from the group consisting of alkali metal hydroxides and their mixtures.

4. The process of claim 1 wherein the nitro-paraffinic substrate is of the linear type.

5. The process of claim 1 wherein the nitro-aliphatic substrate is of the cyclic type.

6. The process of claim 1 wherein the cyclic nitroparaffin substrate is nitrocyclohexane and the paraffinone is a cyclohexanone.

7. The process of claim 1 wherein the catalyst is selected from the group consisting of the salts of iron, the salts of ruthenium and mixtures of these salts.

8. The process of claim 1 wherein the nitroparaffin substrate comprises a mixture of $C_{10}$ to $C_{15}$ nitroparaffins containing up to 75 percent by weight and higher of paraffin.

9. A process for catalytically transforming nitroparaffin substrates to their corresponding paraffinones, in a non-oxidizing environment, said substrates being selected from the group consisting of nitrocyclohexane and linear nitroparaffins containing one to 40 carbon atoms, by:

A. Forming an aqueous multi-component homogeneous reaction mixture by:

1. contacting each molar equivalent of substrate to be transformed to paraffinone with,
2. alkanol containing 1 to 4 carbon atoms, said alkanol being present in amounts ranging from about 10 to 98 percent by weight of the entire reaction mixture,
3. water in amounts ranging up to 98 percent by weight of said entire reaction mixture,
4. ruthenium chloride catalyst, said catalyst being present in at least molar equivalents of said substrates, and
5. at least 0.2 molar quantities of potassium hydroxide.

B. Heating said homogeneous reaction mixture between about 25° and 90°C in said non-oxidizing environment, at pressures ranging from about atmospheric up to 500 psig, until said paraffinone product is formed.

10. A process for catalytically transforming nitroparaffin substrates to their corresponding paraffinones, in a non-oxidizing environment, said substrates being selected from the group consisting of nitrocyclohexane and linear nitroparaffins containing one to 40 carbon atoms, by:

A. Forming an aqueous multi-component homogeneous reaction mixture by:
1. contacting each molar equivalent of substrate to be transformed to paraffinone with,
2. alkanol containing 1 to 4 carbon atoms, said alkanol being present in amounts ranging from about 10 to 98% by weight of the entire reaction mixture,
3. water in amounts ranging up to 98 percent by weight of said entire reaction mixture,
4. iron chloride catalyst, said catalyst being present in at least molar equivalents of said substrates, and
5. at least 0.2 molar quantities of potassium hydroxide.

B. Heating said homogeneous reaction mixture between about 25° and 90°C in said non-oxidizing environment, at pressures ranging from about atmospheric up to 500 psig, until said paraffinone product is formed.

11. A process for catalytically transforming nitroparaffin substrates to their corresponding paraffinones, in a non-oxidizing environment, said substrates being selected from the group consisting of nitrocyclohexane and linear nitroparaffins containing one to 40 carbon atoms, by:

A. Forming an aqueous multi-component homogeneous reaction mixture by:
(1) contacting each molar equivalent of substrate to be transformed to paraffinone with,
(2) alkanol containing 1 to 4 carbon atoms, said alkanol being present in amounts ranging from about 10 to 98 percent by weight of the entire reaction mixture,
(3) water in amounts ranging up to 98 percent by weight of said entire reaction mixture,
(4) iron chloride catalyst, said catalyst being present in at least molar equivalents of said substrates, and
(5) at least 0.2 molar quantities of sodium hydroxide.

B. Heating said homogeneous reaction mixture between about 25° and 90°C in said non-oxidizing environment, at pressures ranging from about atmospheric up to 500 psig, until said paraffinone product is formed.

* * * * *